United States Patent
Bertram et al.

(10) Patent No.: US 9,514,162 B2
(45) Date of Patent: Dec. 6, 2016

(54) SMART POLLING FREQUENCY

(71) Applicant: INTERNATIONAL BUSINESS MACHINES CORPORATION, Armonk, NY (US)

(72) Inventors: Randal L. Bertram, Raleigh, NC (US); Edward N. Fink, Raleigh, NC (US); Steven G. Halverson, Rochester, MN (US); Renier Morales, Gurabo, PR (US)

(73) Assignee: INTERNATION BUSINESS MACHINES CORPORATION, Armonk, NY (US)

( * ) Notice: Subject to any disclaimer, the term of this patent is extended or adjusted under 35 U.S.C. 154(b) by 391 days.

(21) Appl. No.: 13/913,170

(22) Filed: Jun. 7, 2013

(65) Prior Publication Data
US 2014/0365427 A1 Dec. 11, 2014

(51) Int. Cl.
*G06F 17/00* (2006.01)
*G06F 17/30* (2006.01)
*G06F 11/30* (2006.01)
*G06F 11/32* (2006.01)

(52) U.S. Cl.
CPC ..... *G06F 17/30289* (2013.01); *G06F 11/3096* (2013.01); *G06F 11/328* (2013.01); *G06F 17/30306* (2013.01)

(58) Field of Classification Search
CPC .............. G06F 17/30289; G06F 17/30306
USPC .................................................. 707/609, 803
See application file for complete search history.

(56) References Cited

U.S. PATENT DOCUMENTS

| | | | | |
|---|---|---|---|---|
| 5,550,970 A * | 8/1996 | Cline | .......... | G06F 9/50 345/440 |
| 8,166,257 B1 * | 4/2012 | Holl, II | .......... | G06F 13/28 711/114 |
| 8,429,282 B1 * | 4/2013 | Ahuja | .......... | H04L 47/19 709/219 |
| 8,527,626 B1 * | 9/2013 | Wang | .......... | G06F 3/061 709/224 |
| 2002/0112040 A1 * | 8/2002 | Chang | .......... | H04L 41/5035 709/223 |
| 2003/0154192 A1 * | 8/2003 | Laborde | .......... | G06F 17/30312 707/E17.005 |
| 2006/0168586 A1 * | 7/2006 | Stone | .......... | G06F 9/485 718/104 |
| 2007/0240215 A1 * | 10/2007 | Flores | .......... | G06F 21/55 726/24 |
| 2008/0141261 A1 * | 6/2008 | Machida | .......... | G06F 11/3495 718/104 |
| 2008/0306985 A1 * | 12/2008 | Murray | .......... | G06Q 10/10 707/E17.005 |
| 2010/0175134 A1 * | 7/2010 | Ali-Ahmad | .......... | H04L 63/1408 726/24 |
| 2010/0293112 A1 * | 11/2010 | Prahlad | .......... | G06F 3/0605 705/418 |
| 2012/0317358 A1 * | 12/2012 | Ando | .......... | G06F 3/0605 711/117 |

(Continued)

*Primary Examiner* — Phong Nguyen
(74) *Attorney, Agent, or Firm* — Griffiths & Seaton PLLC (57) ABSTRACT

For smart polling frequency in datastores by a processor device in a computing environment, individual polling operations are performed for refreshing each one of the datastores according to polling frequencies. Each one of the polling frequencies depends on recent system activity and each one of the datastores. Each of the polling frequencies are dynamically adjusted for each one of the datastores.

20 Claims, 10 Drawing Sheets

(56) References Cited

U.S. PATENT DOCUMENTS

2015/0160885 A1* 6/2015 Hara ................ H04L 61/10
710/74

* cited by examiner

FIG. 12 ed in the

SMART POLLING FREQUENCY

BACKGROUND OF THE INVENTION

Field of the Invention

The present invention relates in general to computers, and more particularly to smart polling frequency in datastores in a computing environment.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement.

With the advancement of these technologies, many computing systems utilize user interfaces of computing devices to display data. To obtain this data for display, for example, the data must be gathered from the computing system. To improve overall efficiency and lessen resource use, among other benefits, there is a continuing need to gather data on a more efficient basis from the computing systems.

SUMMARY OF THE DESCRIBED EMBODIMENTS

In one embodiment, a method is provided for smart polling frequency in datastores by a processor device in a computing environment. In one embodiment, by way of example only, individual polling operations are performed for refreshing each one of the datastores according to polling frequencies. Each one of the polling frequencies depends on recent system activity and each one of the datastores. Each of the polling frequencies are dynamically adjusted for each one of the datastores.

In another embodiment, a computer system is provided for smart polling frequency in datastores by a processor device in a computing environment. The computer system includes a computer-readable medium and a processor in operable communication with the computer-readable medium. The processor performs individual polling operations for refreshing each one of the datastores according to polling frequencies. Each one of the polling frequencies depends on recent system activity and each one of the datastores. Each of the polling frequencies are dynamically adjusted for each one of the datastores.

In a further embodiment, a computer program product is provided for smart polling frequency in datastores by a processor device in a computing environment. The computer-readable storage medium has computer-readable program code portions stored thereon. The computer-readable program code portions include a first executable portions that performs individual polling operations for refreshing each one of the datastores according to polling frequencies. Each one of the polling frequencies depends on recent system activity and each one of the datastores. Each of the polling frequencies are dynamically adjusted for each one of the datastores.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

In one embodiment, as described herein, polling is a communications technique that determines when a terminal (e.g., a server in a computing system) is ready to send new, changed, and/or altered data. For example, a computer may continually interrogate its connected terminals in a round robin sequence. If a terminal has data to send, it sends back an acknowledgment and the transmission of the new, changed, and/or altered data begins. In one embodiment, polling is a technique that continually interrogates a peripheral device (e.g., a server in a computing system) to see if it has data to transfer. Client computing devices may routinely poll server computing devices to download and/or retrieve data from the computing server devices. For example, a given client periodically polls a server to determine if there is new data to download. If there is new, changed, and/or altered data then the client downloads the new and/or altered data from the server.

Currently, polling operations face several challenges. First, detecting immediate changes to data is currently a challenge for a polling operation. For example, the time it takes to detect a change in the data is between 0 and the polling interval and is unpredictable to the user. If a change is made prior to the polling interval, the user is aware of the new and/or changed data until the polling operation is performed. Second, a current challenge polling operations experience is avoiding an increase of computing resource loads on a server especially when more than one simultaneous polling operations request an entire dataset from the server, which can require a database query or the like (e.g., such is the case in OpenStack, which is an Infrastructure as a Service (IaaS) cloud computing project that is a free open source software). Third, polling operations increase network traffic. Finally, amongst other possible challenges, polling operations may have scalability problems as the amount of data in each poll increases. For example, the browser can spend too much time processing each poll thus slowing down the UI. As another example, if a significant number of users login at the same time the load on the server increases. Nevertheless, polling is required in many situations. For example, consider some applications, such as PowerVC®, which is based on OpenStack, where the browser UI must poll the server to retrieve updates. Each poll returns the entire dataset for a given type of resource thereby causing usability and scalability problems.

Thus, to address these problems, the present invention provides a solution for smart polling frequency in datastores by a processor device in a computing environment. In one embodiment, by way of example only, individual polling operations are performed for refreshing each one of the datastores according to polling frequencies. In one embodiment, a datastore is a browser-side collection of data. A datastore has the following characteristics: 1) a collection of data refreshed from the server 2) reflects/backs data that is shown on the client and 3) represents a specific type of resource that's being displayed (e.g., displayed in a browser). As described herein, each one of the polling frequencies depends on recent system activity and/or on each one of the datastores. Each of the polling frequencies are dynamically adjusted for each one of the datastores.

In one embodiment, the datastores reside in a browser. Each datastore contributes data to the web page. A summary of the store's data may always be displayed on the page and/or a detailed view of the store's data may also be made available for display (e.g., on demand). All data is kept up to date via polling the server. However, the polling interval (e.g., polling frequency) may be different for each datastore, and varies as a result of user and system activity. In one embodiment, the polling frequency is increased for datastores where the data is inherently more volatile. In one embodiment, the polling frequency is increased while a detailed view of that store's data is visible. The polling is temporarily more frequent following a user action that may cause changes to the datastore's data. After the expected changes to the data, the polling returns to the less frequent polling interval. In one embodiment, the polling frequency decreases for one or more data stores when the amount of data in the datastores begin to cause scalability problems (e.g., the polling is taking too long for the browser to process each poll thereby bogging down the server, etc.). The polling operation may even stop on a datastore when the datastore cannot change due to environmental factors (e.g., for example, there is no need to poll volumes and virtual machines (VMs) when a storage system is not registered). In one embodiment, the polling frequency decreases on empty datastores since there are no resources in the store with properties that may frequently change. There are more potential triggers to change the polling frequency. The polling frequency may also be dynamically adjusted for each individual datastores based on predefined factors, user preferences, time periods, predefined polling frequency thresholds (e.g., minimum threshold values and/or maximum threshold values) which indicate one of the polling frequencies is slowing down and/or speeding up, and the like.

Figure 1:
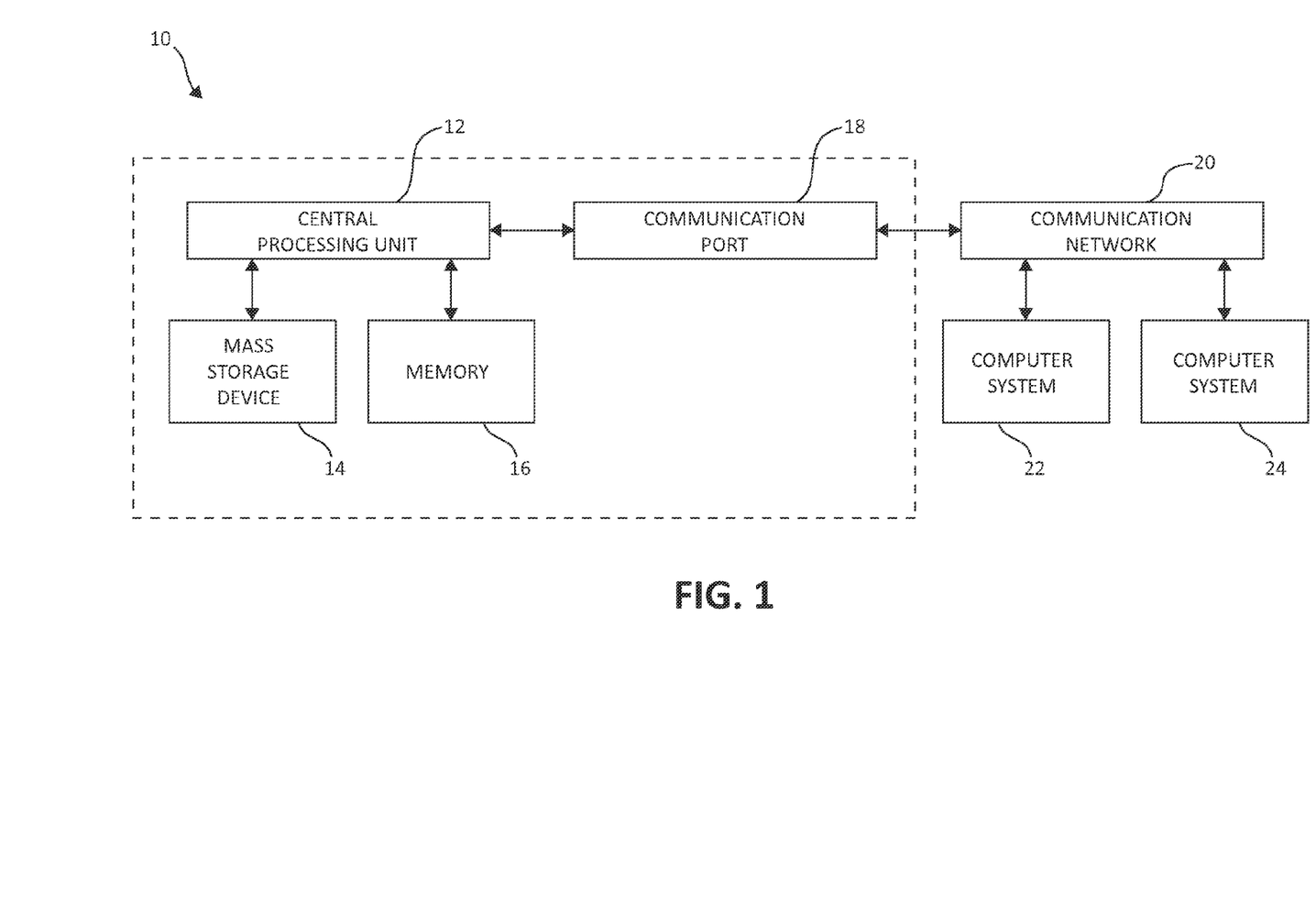
FIG. 1 is a block diagram illustrating a computer storage environment having an exemplary storage device in which aspects of the present invention may be realized.

Turning now to FIG. 1, exemplary architecture 10 of data storage systems in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 2:
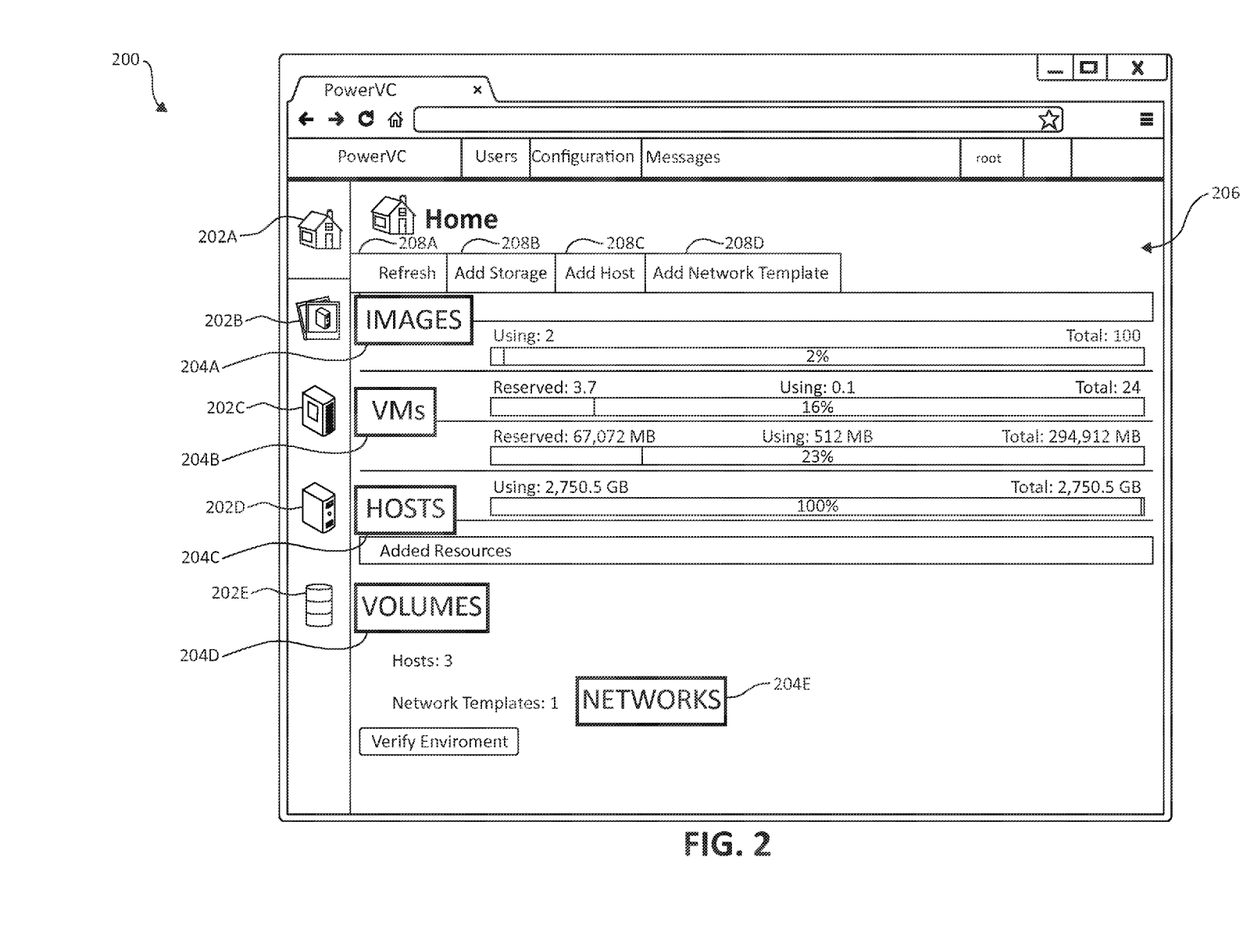
FIG. 2 is a block diagram illustrating a user interface displaying types of resources in a computer system in which aspects of the present invention may be realized.

FIG. 2 is a block diagram illustrating a user interface 200 displaying types of resources in a computer system in which aspects of the present invention may be realized. In FIG. 2, a screenshot 206 of a browser 200 is provided (e.g., a browser in the PowerVC application) and the datastores 204 (illustrated has blown up boxes 204A-E representing the type of resources 202) show each type of resource 202 on the browser 200 screen. Each resource icon 202 fronts a datastore 204. Clicking on the resource icon 202 shows a full-screen view of that datastore. In one embodiment, the icon bar 202 (illustrated with icons 202A-E) on the left represents types of resources the browser manages (e.g., images, VMs, hosts, and volumes displayed for illustration purposes), and other types of resources are shown on the home screen (e.g., the home screen 202A is the active resource that the user is focusing by the user previously selecting the home screen 202A icon). The number under each icon resource 202 shows the number of that type of resource (e.g., 1, 2, or 3 and the like). The numbers are updated periodically by polling with the polling frequency depending on the volatility of that type of resource 202. For example, in one embodiment, images 204A are updated every minute, but VMs 204B are updated every 30 seconds because they change more often. The hosts 204C do not change often, so they are updated every two minutes. It should be noted that the times are illustrated as examples only and may change according to the various computing environments and applications.

As mentioned, the polling is used to keep each type of resource 202 up to date. Other data on the home screen 202A, such as the VMs and processors gauges (shown on the center screen as a bar chart showing the number of processors being used and reserved for example), are based on the same resource datastores 204, and are dependent on polling.

In one embodiment, the server will push events to the browser 200, so polling may not be necessary. Moreover, the events will indicate what changes occurred instead of sending the entire dataset to be refreshed by the browser 200. In one embodiment, these improvements require more advanced application programming interfaces (APIs) on the server, which are not challenging to create. However, many other server/client applications are limited to rest APIs that are not designed for UIs and scalability, and hence polling is necessary. For example, polling is required in all OpenStack-based products and in other application as well. Thus, as described herein, the present invention provides a solution to poll for multiple types of resources, which mitigates the problems with polling, listed above.

Figure 3:
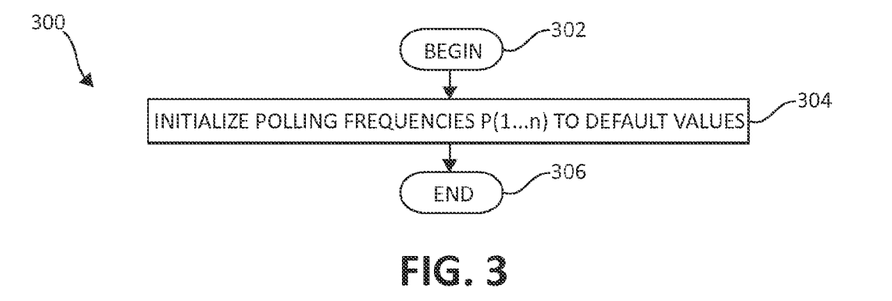
FIG. 3 is a flow chart diagram illustrating an exemplary method for initializing polling frequencies for smart polling frequency in datastores in which aspects of the present invention may be realized.

FIG. 3 is a flow chart diagram illustrating an exemplary method 300 for initializing polling frequencies for smart polling frequency in datastores in which aspects of the present invention may be realized. The method 300 begins (step 302) by initializing polling frequencies (e.g., P(1 . . . n), where P is the number of polling frequencies needed to be initialized) (step 304). The method 300 ends (step 306).

Figure 4:
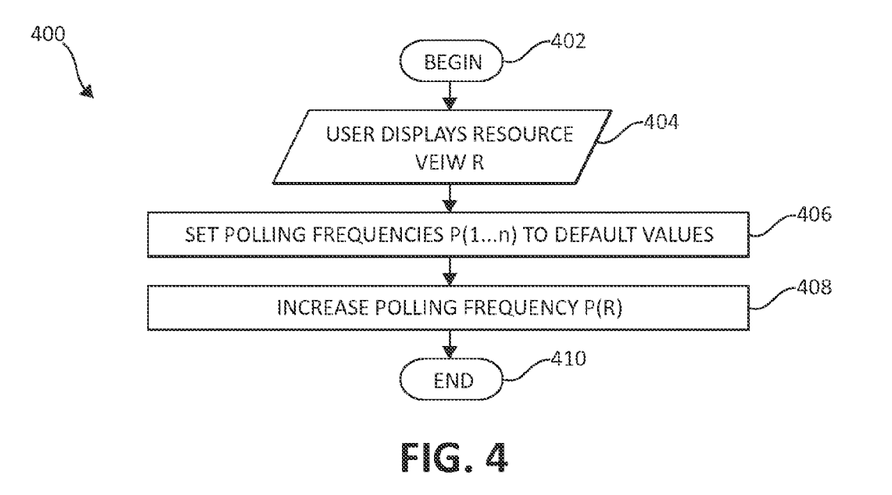
FIG. 4 is a flow chart diagram illustrating an exemplary method for dynamically increasing polling frequencies for smart polling frequency in datastores in which aspects of the present invention may be realized.

FIG. 4 is a flow chart diagram illustrating an exemplary method 400 for dynamically increasing polling frequencies for smart polling frequency in datastores in which aspects of the present invention may be realized. The method 400 begins (step 402) by a user interface displaying a resource view R (where R represents the particular resource being displayed (step 404). The method 400 sets each of the N number of polling frequencies (e.g., P(1 . . . n)) to default values (step 406). The default values may be randomly generated, predetermined, and/or set based on user preferences. It should be noted that the polling frequencies may be set at one or more default values (e.g., poll frequency occurs at every 20 seconds). The polling frequencies may be increased to occur at a polling frequency that is less than the default value (e.g., polling frequencies occur every 2 seconds), and/or the polling frequencies may be decreased to occur at a polling frequency that is more than the default value (e.g., polling frequencies occur every 30 seconds). In other words, the polling frequencies may be increased, decreased, slowed, and/or stopped in relationship to the default values. The method 400 dynamically increases one or more polling frequencies P(R) (e.g., dynamically increase the polling frequency for one datastore and/or resource (step 408). The method 400 ends (step 410).

Figure 5:
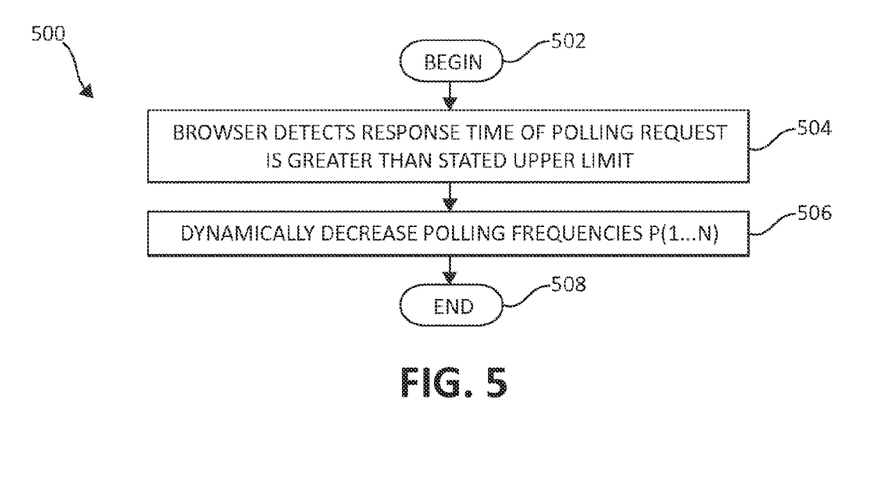
FIG. 5 is a flow chart diagram illustrating an exemplary method for dynamically decreasing polling frequencies for smart polling frequency in datastores in which aspects of the present invention may be realized.

FIG. 5 is a flow chart diagram illustrating an exemplary method 500 for dynamically decreasing polling frequencies for smart polling frequency in datastores in which aspects of the present invention may be realized. The method 500 begins (step 502) by detecting, by a browser, a response time of a polling request is greater than some stated upper limit (step 504). The detection may include detecting the response time is at, below, and/or above the stated upper limit. The stated upper limit may be a predetermined threshold set at any number value (e.g., 0, 1, 2, 5, 10 etc.) based on user preference and/or some other factor, such as hardware and/or software capacity and technology. The method 500 dynamically decreases one or more polling frequencies (e.g., P(1 . . . n)) (step 506). The method 500 ends (step 508).

Figure 6:
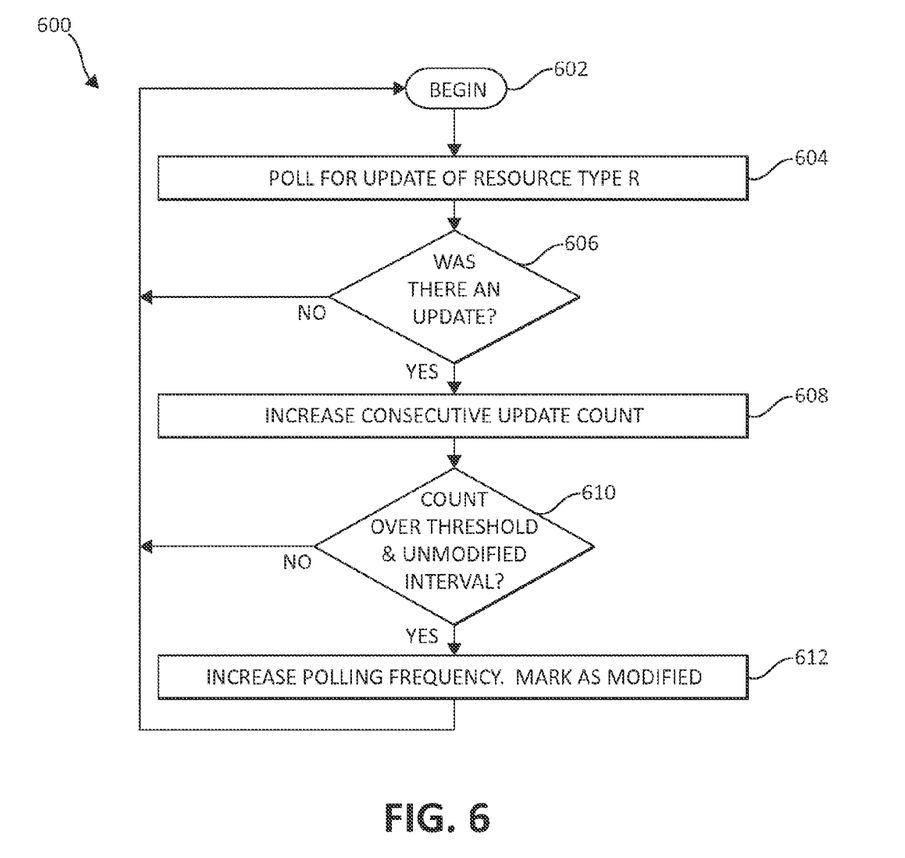
FIG. 6 is a flow chart diagram illustrating an exemplary method for dynamically increasing polling frequencies based on a running count of activities in which aspects of the present invention may be realized.

FIG. 6 is a flow chart diagram illustrating an exemplary method 600 for dynamically increasing polling frequencies based on a running count of activities in which aspects of the present invention may be realized. FIG. 6 depicts increasing of polling frequency based on a running count of activity. The method 600 begins (step 602) by polling for an update of a resource of type R (step 602). The method 600 determines if there is an update (step 604). If no, the method 600 returns to step 602. If yes, increases a consecutive update count (step 606). The method 600 determines if the consecutive update count is over some threshold value (e.g., some numerical value such as 0, 1, 2, 3, etc.) and unmodified interval (step 608). If no, the method 600 returns to step 602. If yes, the method 600 increases one or more polling frequencies and marks the consecutive update count as modified (step 610). The method 600 returns to step 602.

Figure 7:
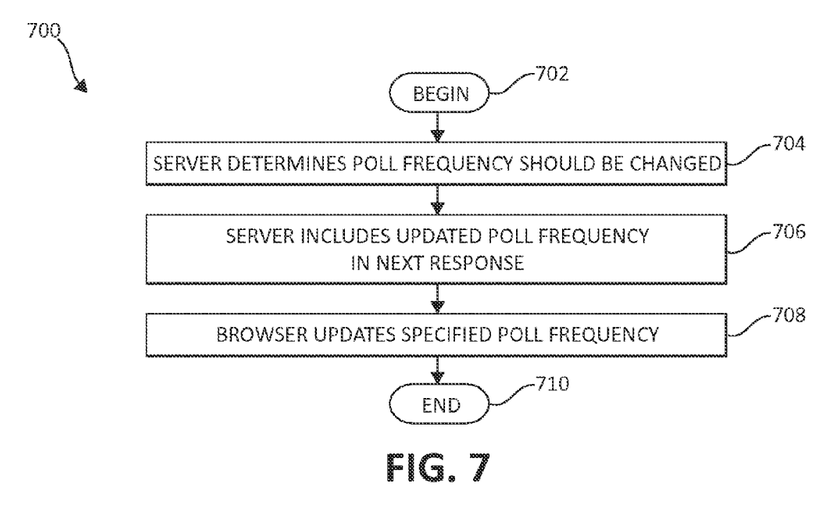
FIG. 7 is a flow chart diagram illustrating an exemplary method for dynamically updating polling frequencies based determination a polling frequency should be changed in which aspects of the present invention may be realized.

FIG. 7 is a flow chart diagram illustrating an exemplary method 700 for dynamically updating polling frequencies based determination a polling frequency should be changed in which aspects of the present invention may be realized. FIG. 7 depicts a server determination of suggested poll frequency should be changed and the determination could be based on server knowledge of resource dynamics, server load, or even time of day. The method 700 begins (step 702) by determining by a server that one or more polling frequencies should be dynamically changed (step 704). The server includes an updated polling frequency in a subsequent response (step 706). A browser updates the specified polling frequency (step 708). The method 700 ends (step 710).

Figure 8:
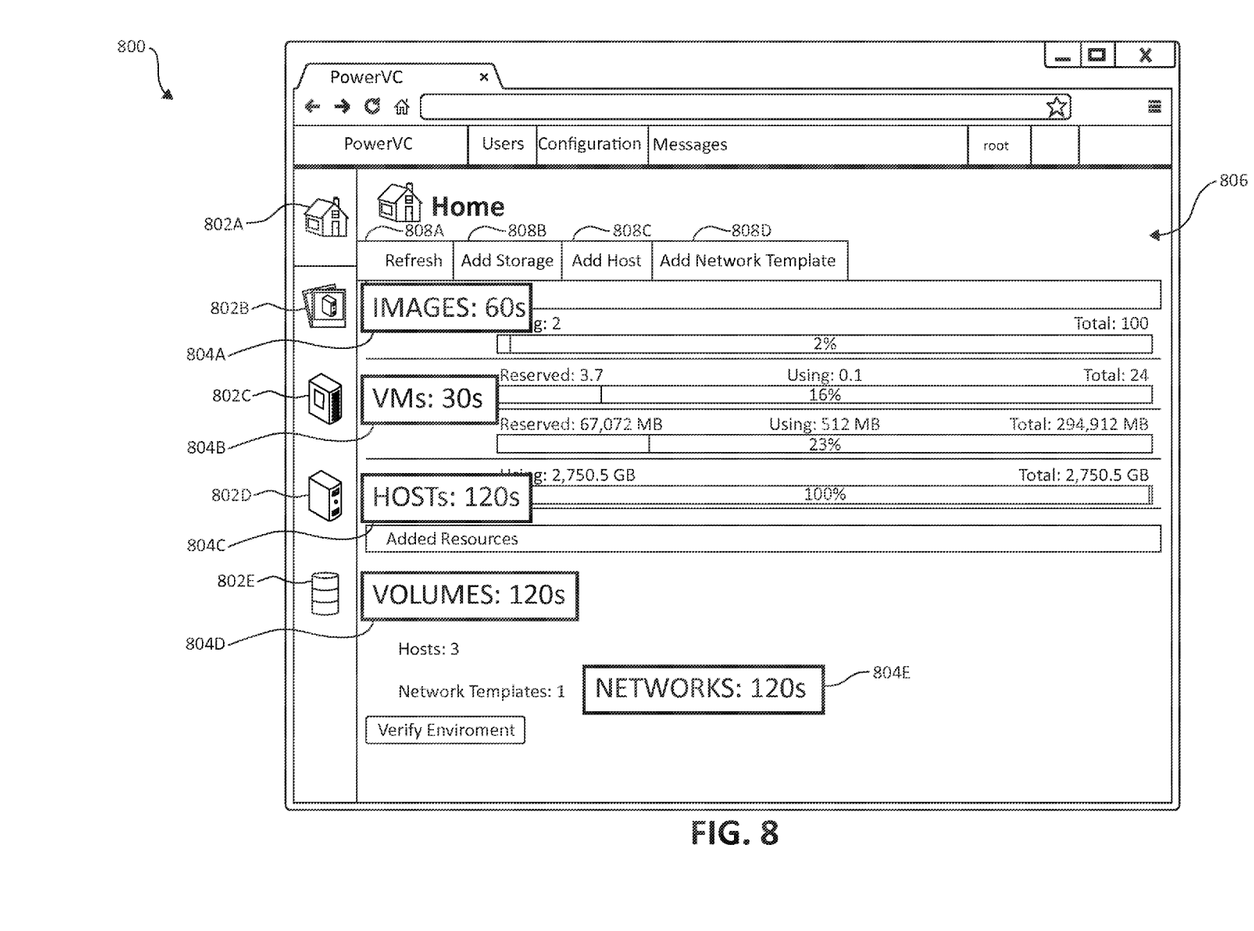
FIG. 8 is a block diagram illustrating a user interface displaying types of resources for dynamically decreasing polling frequencies for smart polling frequency in datastores with a home view in a computer system in which aspects of the present invention may be realized.

FIG. 8 is a block diagram illustrating a user interface 800 displaying types of resources for dynamically decreasing polling frequencies for smart polling frequency in datastores with a home view in a computer system in which aspects of the present invention may be realized. In FIG. 8, a screenshot 806 of a browser 800 is provided (e.g., a browser in the PowerVC application) and the datastores 804 (illustrated has blown up boxes 804A-E representing the type of resources 802) show each type of resource 802 on the browser 800 screen. Each resource icon 802 fronts a datastore 804 (e.g., showing current usage of 60 users of the images 804A, 30 processors of the VMs 804B, 120 disk of hosts 804C, and 120 volumes of volume datastore 804D, and 120 datastore networks 804E). Clicking on the resource icon 802A shows a full-screen view of the home screen and the represented datastore 804C. In one embodiment, the icon bar 802 (illustrated with icons 802A-E) on the left represents types of resources the browser manages (e.g., images, VMs, hosts, and volumes displayed for illustration purposes), and other types of resources are shown on the home screen (e.g., the home screen 802A is the active resource that the user is focusing by the user previously selecting the home screen 802A icon). The number under each icon resource 802 shows the number of that type of resource (e.g., 1, 2, or 3 and the like). The numbers are updated periodically by polling with the polling frequency depending on the volatility of that type of resource 802. For example, in one embodiment, now that the browser 800 screen is now focused on hosts 802C, the hosts datastore 804C is updated every 30 seconds instead of every two minutes. The other polling frequencies are then reduced. Every 30 seconds, the UI in the browser 800 will poll the server for the hosts dataset 804C, reloading the entire table of data. It should be noted that the times are illustrated as examples only and may change according to the various computing environments and applications.

Figure 9:
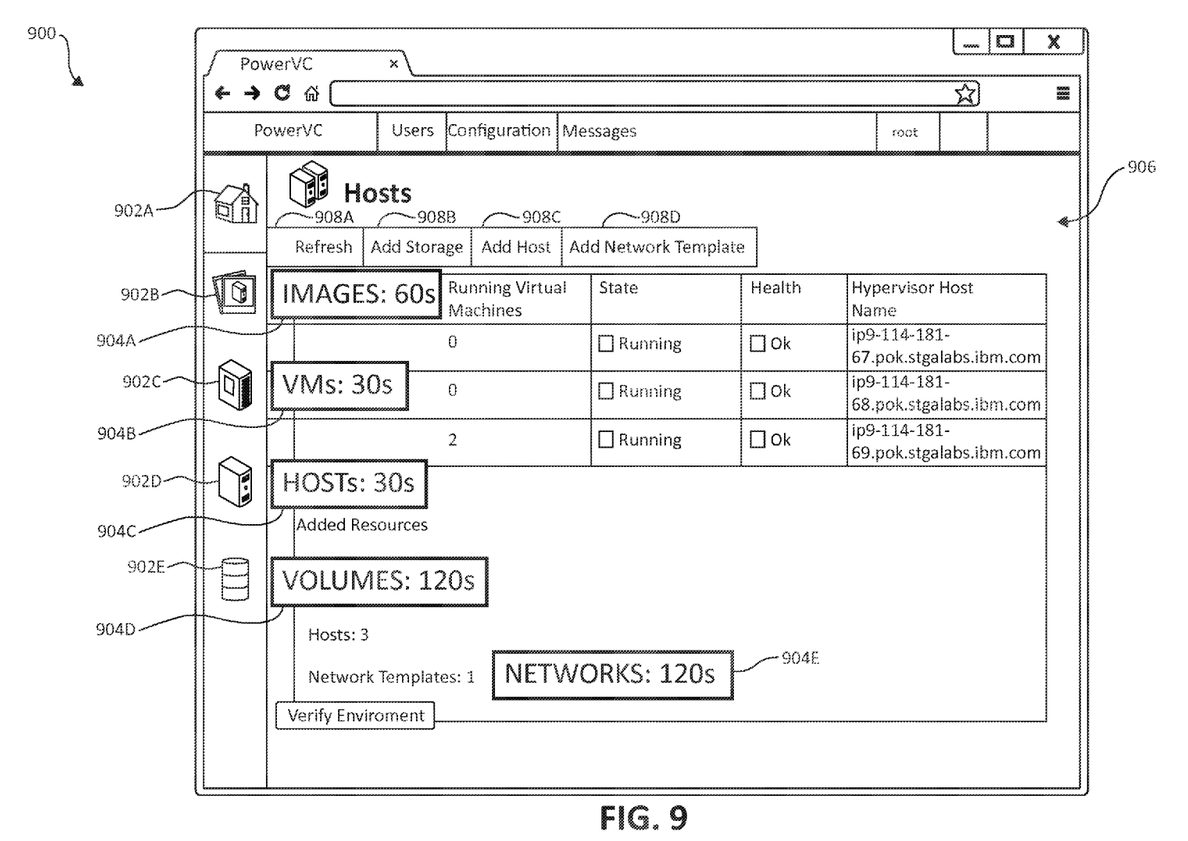
FIG. 9 is a block diagram illustrating a user interface displaying types of resources for dynamically decreasing polling frequencies for smart polling frequency in datastores with a host view in a computer system in which aspects of the present invention may be realized.

FIG. 9 is a block diagram illustrating a user interface 900 displaying types of resources for dynamically decreasing polling frequencies for smart polling frequency in datastores with a host view in a computer system in which aspects of the present invention may be realized. In FIG. 9, a screenshot 906 of a browser 900 is provided (e.g., a browser in the PowerVC application) and the datastores 904 (illustrated has blown up boxes 904A-E representing the type of resources 902) show each type of resource 902 on the browser 900 screen. Each resource icon 902 fronts a datastore 904 (e.g., showing current usage of 120 users of the images 904A, 60 processors of the VMs 904B, 30 disks of hosts 904C, and 120 volumes of volume datastore 904D, and 600 datastore networks 904E). Clicking on the resource icon 902C shows a full-screen view of the host resource and the represented datastore 904C. In one embodiment, the icon bar 902 (illustrated with icons 902A-E) on the left represents types of resources the browser manages (e.g., images, VMs, hosts, and volumes displayed for illustration purposes), and other types of resources are shown on the home screen (e.g., the home screen 902A is the active resource that the user is focusing by the user previously selecting the home screen 902A icon). The number under each icon resource 902 shows the number of that type of resource (e.g., 1, 2, or 3 and the like). The numbers are updated periodically by polling with the polling frequency depending on the volatility of that type of resource 902. For example, in one embodiment, now that the browser 900 screen is now focused on hosts 902C, the hosts datastore 904C is updated every 30 seconds instead of every two minutes. The other polling frequencies are then reduced. Every 30 seconds, the UI in the browser 900 will poll the server for the hosts dataset 904C, reloading the entire table of data. It should be noted that the times are illustrated as examples only and may change according to the various computing environments and applications.

Figure 10:
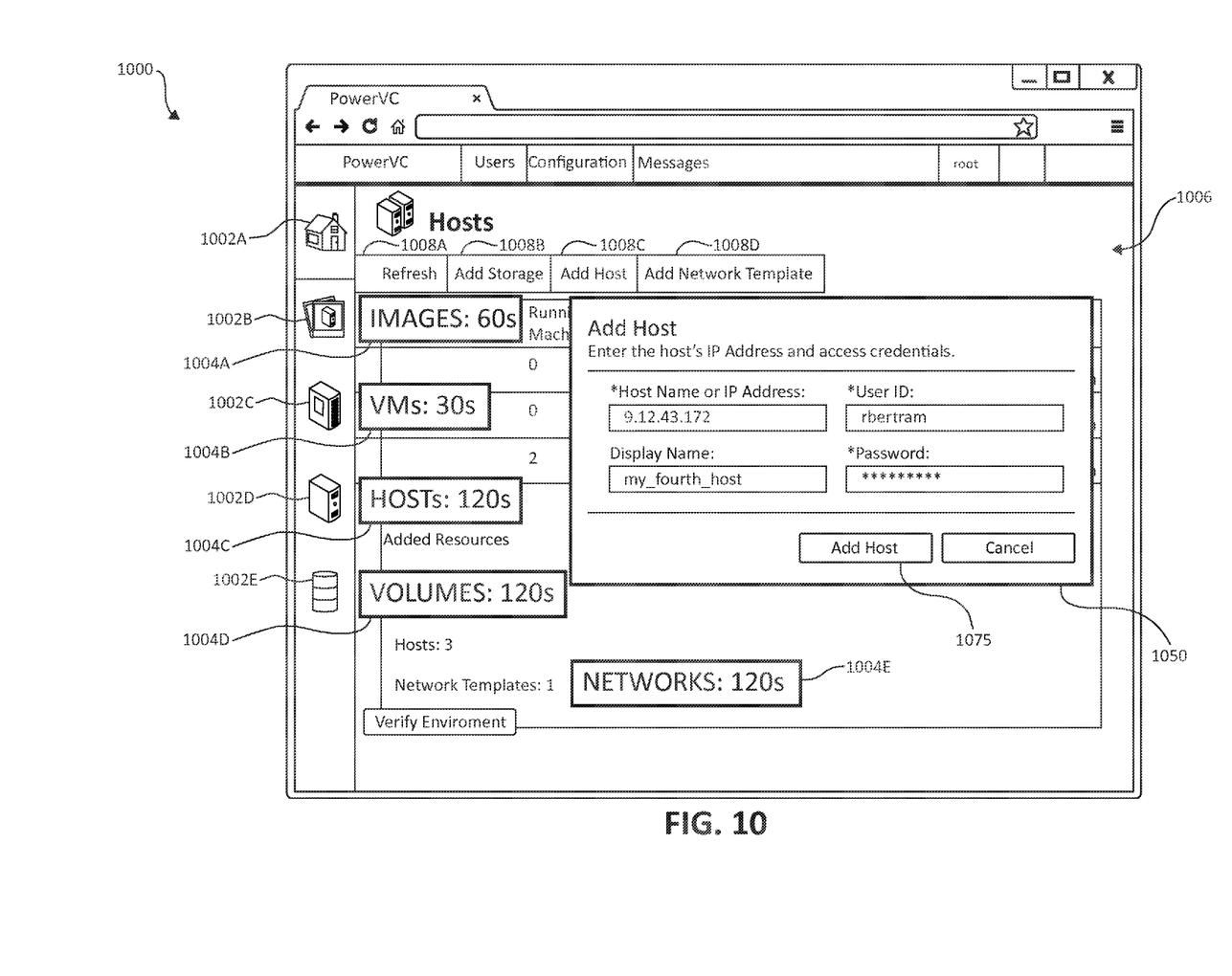
FIG. 10 is a block diagram illustrating an alternative user interface displaying types of resources with dynamically decreasing polling frequencies for smart polling frequency in datastores with a host view and adding a host in a computer system in which aspects of the present invention may be realized.

FIG. 10 is a block diagram illustrating an alternative user interface 1000 displaying types of resources with dynamically decreasing polling frequencies for smart polling frequency in datastores with a host view and adding a host in a computer system in which aspects of the present invention may be realized. In FIG. 10, a screenshot 1006 of a browser 1000 is provided (e.g., a browser in the PowerVC application) and the datastores 1004 (illustrated has blown up boxes 1004A-E representing the type of resources 1002) show each type of resource 1002 on the browser 1000 screen. Each resource icon 1002 fronts a datastore 1004. Clicking on the resource icon 1002C shows a full-screen view of the host resource and the represented datastore 1004C. In one embodiment, the icon bar 1002 (illustrated with icons 1002A-E) on the left represents types of resources the browser manages (e.g., images, VMs, hosts, and volumes displayed for illustration purposes), and other types of resources are shown on the home screen (e.g., the home screen 1002A is the active resource that the user is focusing by the user previously selecting the home screen 1002A icon). The number under each icon resource 1002 shows the number of that type of resource (e.g., 1, 2, or 3 and the like). The numbers are updated periodically by polling with the polling frequency depending on the volatility of that type of resource 1002. However, as depicted in FIG. 10, with the host resource 202C being activated (e.g., and a user focusing on the data and resource of the host datastore 206C) the user wished to add a host. Here, the user selects add a host icon listed on the browser. In so doing, an enlarged box 1050 is presented to add the host and with the browser information screen set in the background. The new added host information is entered and/or collected (e.g., host name, host IP address, user ID, password, and/or a display name) in the dialog box 1050 and an add host option 1075 available. It should be noted that the host polling frequency drops to a very low number until the new host is added.

Figure 11:
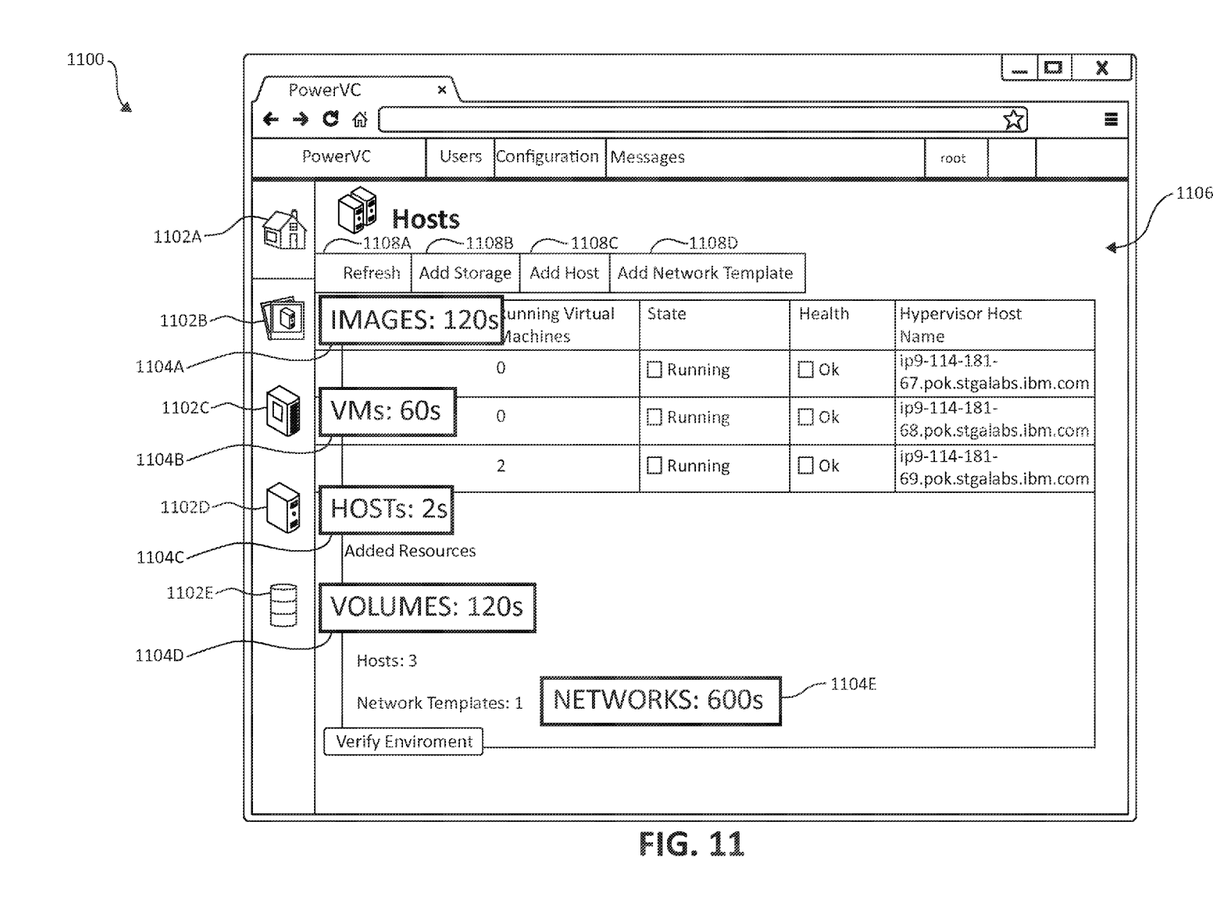
FIG. 11 is a block diagram illustrating an alternative user interface 1100 displaying types of resources for dynamically increasing polling frequencies for smart polling frequency in datastores where the host is polled frequently because a new host is expected in a computer system in which aspects of the present invention may be realized.

After performing the functions described above in FIG. 10, by clicking on the Add Host button 1075 in the dialog box 1050, the add host feature will then dismiss the dialog box 1075, and move to the underlying screen, as described in FIG. 11. FIG. 11 is a block diagram illustrating a user interface 1100 displaying types of resources for dynamically increasing polling frequencies for smart polling frequency in datastores where the host is polled frequently because a new host is expected in a computer system in which aspects of the present invention may be realized. In FIG. 11, a screenshot 1106 of a browser 1100 is provided (e.g., a browser in the PowerVC application) and the datastores 1104 (illustrated has blown up boxes 1104A-E representing the type of resources 1102) show each type of resource 1102 on the browser 1100 screen. Each resource icon 1102 fronts a datastore 1104 (e.g., showing current usage of 120 users of the images 1104A, 60 processors of the VMs 1104B, 2 disks of hosts 1104C, and 120 volumes of volume datastore 1104D, and 600 datastore networks 1104E). Clicking on the resource icon 1102C shows a full-screen view of the host resource and the represented datastore 1104C. In one embodiment, the icon bar 1102 (illustrated with icons 1102A-E) on the left represents types of resources the browser manages (e.g., images, VMs, hosts, and volumes displayed for illustration purposes), and other types of resources are shown on the home screen (e.g., the home screen 1102A is the active resource that the user is focusing by the user previously selecting the home screen 1102A icon). The number under each icon resource 1102 shows the number of that type of resource (e.g., 1, 2, or 3 and the like). As illustrated in FIG. 11, the present invention dynamically increases polling frequencies in datastores because a new host is expected. Since a new host is expected soon, in one embodiment, by way of example only, the new host may appear in 1 second or 20 seconds. So the Hosts datastore 1204C begins polling every 2 seconds, so that as soon as the new host appears, it can update the table. For example, having the polling frequencies set at a default value (e.g., poll frequency occurs at every 20 seconds), the polling frequencies may be increased to poll every 2 seconds. In other words, the polling frequencies may be increased in relationship to the default values.

Figure 12:
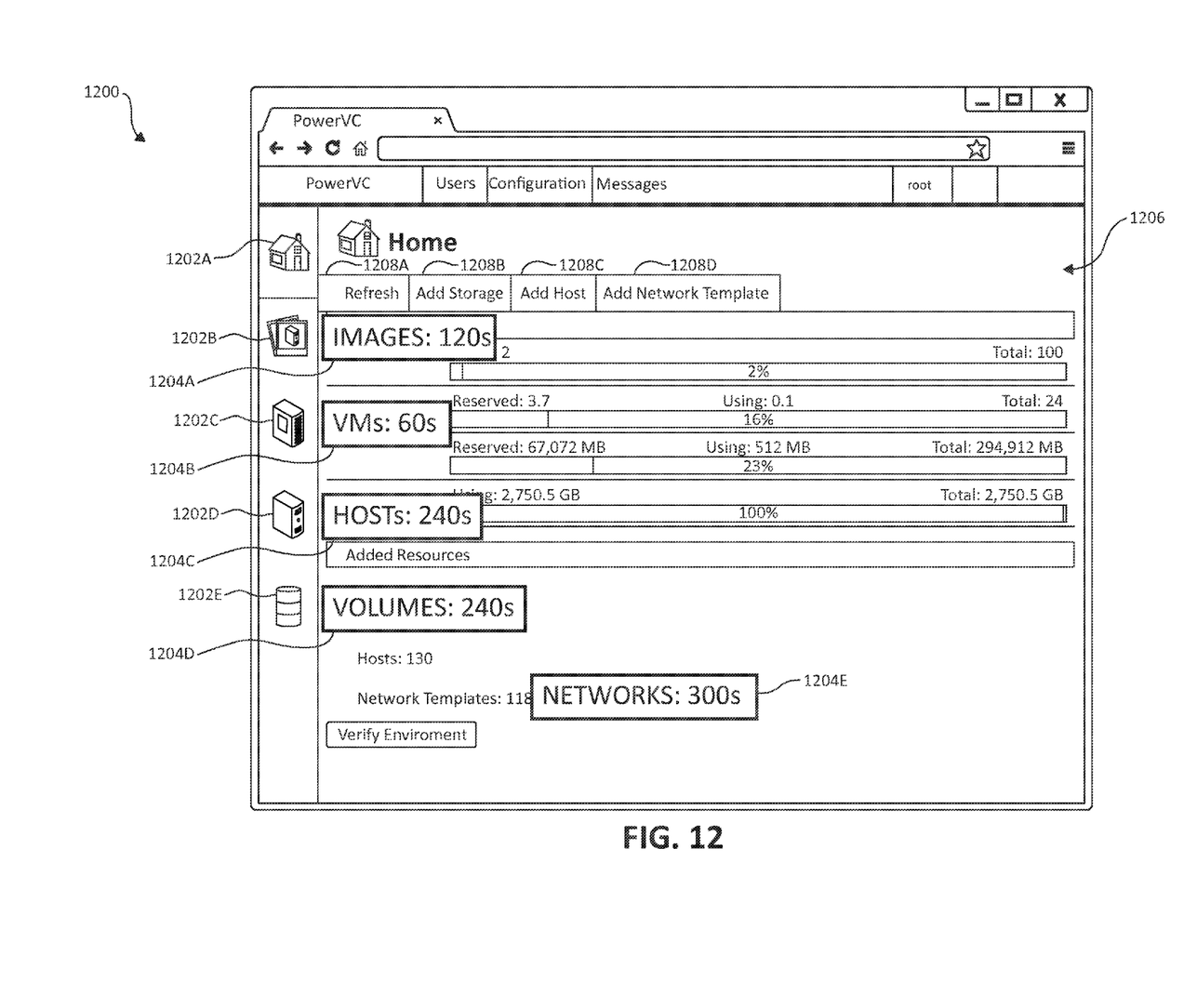
FIG. 12 is a block diagram illustrating an alternative user interface displaying types of resources with dynamically decreasing polling frequencies for smart polling frequency in datastores after a host has been added in a computer system in which aspects of the present invention may be realized.

FIG. 12 is a block diagram illustrating an alternative user interface 1200 displaying types of resources with dynamically decreasing polling frequencies for smart polling frequency in datastores after a host has been added in a computer system in which aspects of the present invention may be realized. In FIG. 12, a screenshot 1206 of a browser 1200 is provided (e.g., a browser in the PowerVC application) and the datastores 1204 (illustrated has blown up boxes 1204A-E representing the type of resources 1202) show each type of resource 1202 on the browser 1200 screen again in the home screen 802A. Each resource icon 1202 fronts a datastore 1204 (e.g., showing current usage of 120 users of the images 1204A, 60 processors of the VMs 1204B, 240 disk of hosts 1204C, and 240 volumes of volume datastore 1204D, and 300 datastore networks 1204E). Clicking on the resource icon 1202C shows a full-screen view of the host resource and the represented datastore 1204C. In one embodiment, the icon bar 1202 (illustrated with icons 1202A-E) on the left represents types of resources the browser manages (e.g., images, VMs, hosts, and volumes displayed for illustration purposes), and other types of resources are shown on the home screen (e.g., the home screen 1202A is the active resource that the user is focusing by the user previously selecting the home screen 1202A icon). The number under each icon resource 1202 shows the number of that type of resource (e.g., 1, 2, or 3 and the like). The numbers are updated periodically by polling with the polling frequency depending on the volatility of that type of resource 1202.

However, now a new host is expected soon, as described in FIG. 11. In one embodiment, by way of example only, the new host may appear in 1 second or 20 seconds. So the Hosts datastore 1204C begins polling every 2 seconds, so that as soon as the new host appears, it can update the table. When the host is added to the table, the Hosts datastore 1203C will go back to polling every 30 seconds. It should be noted that there are many situations where similar logic can temporarily reduce and/or elevate polling intervals. For example, after registering a host and/or a volume (and/or other resources), the polling for the respective datastore may speed up because users often add several of these resources at a time. After a few minutes of no new registrations, the polling frequencies would slow back down to normal (e.g., a default polling frequency and/or a predefined polling frequency). In one embodiment, when a VM is starting and/or stopping, the polling level should be temporarily elevated until the VM is started or stopped. In one embodiment, the present invention manages polling intervals as a constrained resource. In one embodiment, all the datastores are constrained from polling too frequently otherwise the browser will hang (e.g., stall and/or delay) because it will continually be processing data from the server. This would impact the server's performance and cause too much network traffic. These problems become more likely as the number of resources (images, VMs, hosts, and/or volumes) increases. In this case, longer polling intervals must be used. Thus, in one embodiment, the present invention dynamically and automatically reduces polling frequencies when collisions and delays begin to occur and/or when the server signals that the polls are taking more resources than it can currently afford. (It should be noted that in one embodiment, a collision (and/or be an update overlap) occurs when new data is available before the client has finished processing the previous update. Thus, the two updates may be referred to as, viewed as, and/or defined as colliding. In one embodiment, rather than viewing such as a "collision" such a process may be referred to as "update overlaps" instead of collisions. This allows the UI to gracefully scale to any number of resources—though the penalty is that the data will be less and less fresh, and users will more often need to click the refresh buttons on the tables. Thus, in one embodiment, gracefully scaling to any number of resource means displaying a high number of resources on the browser while still responding at an acceptable speed to user interactions. The flip-side would be the browser getting bogged down by updates because the server is managing a high number of resources. This would lead to a negative user experience as all the UIs' performance have degraded. Because the number of updates received do not increase dramatically with the number of resources, the present invention continues to perform at a high level browser-side.

In one embodiment, by way of example only, the present invention provides for smart polling frequency in datastores by a processor device in a computing environment. In one embodiment, by way of example only, individual polling operations are performed for refreshing each one of the datastores according to polling frequencies. Each one of the polling frequencies depends on recent system activity and each one of the datastores. Each of the polling frequencies are dynamically adjusted for each one of the datastores.

In one embodiment, by way of example only, the present invention dynamically adjusts each of the polling frequencies for each one of the datastores for handling increasing amounts of data in each of the datastores, maintaining most current data being accessed, and/or updating the data that is most volatile to change.

In one embodiment, by way of example only, the present invention allows for the residing each of the datastores in an application browser, and publishes a the data of each of the datastores in the application browser. The published data displayed in the browser may be a summary of the data and/or specific details of the data.

In one embodiment, by way of example only, the present invention decreases one of the polling frequencies for one of the datastores experiencing a scalability problem.

In one embodiment, by way of example only, the present invention temporarily increases one of the polling frequencies following an operation during a detailed view of a datastore, and/or reduces the temporarily increased polling frequency/frequencies to a slower frequency following a change to the datastore based on the operation.

In one embodiment, by way of example only, the present invention slows one of the polling frequencies for an empty datastore, and stops one of the polling frequencies on a datastore. In one embodiment, by way of example only, the present invention initializes each of the polling frequencies to default values, detects a response time of one of the polling frequencies is greater than, equal to, and/or lower than a predetermined threshold, dynamically decreases one of the polling frequencies, and/or dynamically increase one of the polling frequencies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for smart polling frequency in datastores by a processor device in a computing environment, the method comprising:
    performing individual polling operations for refreshing each one of the datastores according to one of a plurality of polling frequencies, the polling frequencies comprising intervals at which a node interrogates each one of the datastores, wherein each one of the plurality of polling frequencies depends on at least each one of the datastores;
    dynamically adjusting each of the plurality of polling frequencies for each one of the datastores;
    initializing each of the plurality of polling frequencies to a default value; and
    detecting a response time of one of the plurality of polling frequencies is one of greater than and lower than a predetermined threshold.

2. The method of claim 1, further including dynamically adjusting each of the plurality of polling frequencies for each one of the datastore for one of handling increasing amounts of data in each of the datastores, maintaining most current data being accessed, and updating the data that is most volatile to change.

3. The method of claim 1, further including performing one of:
    residing each of the datastores in an application browser, and
    publishing the data of each of the datastores in the application browser, wherein the published data is at least one of a summary of the data and a detailed view of the data.

4. The method of claim 1, further including decreasing one of the plurality of polling frequencies for one of the datastores experiencing a scalability problem.

5. The method of claim 1, further including performing one of:
    temporarily increasing one of the plurality of polling frequencies following an operation of a datastore, and
    reducing the temporarily increased one of the plurality of polling frequencies to a slower frequency following a change to the datastore based on the operation.

6. The method of claim 1, further including performing one of:
    slowing one of the plurality of polling frequencies for an empty datastore, and stopping one of the plurality of polling frequencies on a datastore.

7. The method of claim 1, further including performing one of:
dynamically decreasing one of the plurality of polling frequencies, and
dynamically increasing one of the plurality of polling frequencies.

8. A system for smart polling frequency in datastores in a computing environment, the system comprising:
at least one processor device operable in a storage system and in communication with a cache, a node, and a centralized entity, wherein the at least one processor device:
performs individual polling operations for refreshing each one of the datastores according to one of a plurality of polling frequencies, the polling frequencies comprising intervals at which a node interrogates each one of the datastores, wherein each one of the plurality of polling frequencies depends on at least each one of the datastores;
dynamically adjusts each of the plurality of polling frequencies for each one of the datastores;
initializes each of the plurality of polling frequencies to a default value; and
detects a response time of one of the plurality of polling frequencies is one of greater than and lower than a predetermined threshold.

9. The system of claim 8, wherein the at least one processor device dynamically adjusts each of the plurality of polling frequencies for each one of the datastore for one of handling increasing amounts of data in each of the datastores, maintaining most current data being accessed, and updating the data that is most volatile to change.

10. The system of claim 8, wherein the at least one processor device performs one of:
residing each of the datastores in an application browser, and
publishing the data of each of the datastores in the application browser, wherein the published data is at least one of a summary of the data and a detailed view of the data.

11. The system of claim 8, wherein the at least one processor device decreases one of the plurality of polling frequencies for one of the datastores experiencing a scalability problem.

12. The system of claim 8, wherein the at least one processor device performs one of:
temporarily increasing one of the plurality of polling frequencies following an operation of a datastore, and
reducing the temporarily increased one of the plurality of polling frequencies to a slower frequency following a change to the datastore based on the operation.

13. The system of claim 8, wherein the at least one processor device performs one of:
slowing one of the plurality of polling frequencies for an empty datastore, and
stopping one of the plurality of polling frequencies on a datastore.

14. The system of claim 8, wherein the at least one processor device performs one of:
dynamically decreasing one of the plurality of polling frequencies, and
dynamically increasing one of the plurality of polling frequencies.

15. A computer program product for smart polling frequency in datastores by a processor device in a computing environment, the computer program product comprising a non-transitory computer-readable storage medium having computer-readable program code portions stored therein, the computer-readable program code portions comprising:
a first executable portion that performs individual polling operations for refreshing each one of the datastores according to one of a plurality of polling frequencies, the polling frequencies comprising intervals at which a node interrogates each one of the datastores, wherein each one of the plurality of polling frequencies depends on at least each one of the datastores; and
a second executable portion that dynamically adjusts each of the plurality of polling frequencies for each one of the datastores,
initializes each of the plurality of polling frequencies to a default value, and
detects a response time of one of the plurality of polling frequencies is one of greater than and lower than a predetermined threshold.

16. The computer program product of claim 15, further including a third executable portion that dynamically adjusts each of the plurality of polling frequencies for each one of the datastore for one of handling increasing amounts of data in each of the datastores, maintaining most current data being accessed, and updating the data that is most volatile to change.

17. The computer program product of claim 15, further including a third executable portion that performs one of:
residing each of the datastores in an application browser, and
publishing the data of each of the datastores in the application browser, wherein the published data is at least one of a summary of the data and a detailed view of the data.

18. The computer program product of claim 15, further including a third executable portion that decreases one of the plurality of polling frequencies for one of the datastores experiencing a scalability problem.

19. The computer program product of claim 15, further including a third executable portion that performs one of:
temporarily increasing one of the plurality of polling frequencies following an operation of a datastore,
reducing the temporarily increased one of the plurality of polling frequencies to a slower frequency following a change to the datastore based on the operation,
slowing one of the plurality of polling frequencies for an empty datastore, and
stopping one of the plurality of polling frequencies on a datastore.

20. The computer program product of claim 15, further including a third executable portion that performs one of:
dynamically decreasing one of the plurality of polling frequencies, and
dynamically increasing one of the plurality of polling frequencies.

* * * * *